(12) United States Patent
James

(10) Patent No.: US 6,625,850 B2
(45) Date of Patent: Sep. 30, 2003

(54) V-LOCK

(76) Inventor: Crispin James, Harden Clough, 1 Green Bottom, Meltham, Holmfirth, Yorkshire HD9 4BD (GB)

( * ) Notice: Subject to any disclaimer, the term of this patent is extended or adjusted under 35 U.S.C. 154(b) by 0 days.

(21) Appl. No.: 09/982,969

(22) Filed: Oct. 22, 2001

(65) Prior Publication Data

US 2002/0088096 A1 Jul. 11, 2002

(30) Foreign Application Priority Data

Jan. 11, 2001 (GB) .............................. 0100744

(51) Int. Cl.[7] .............................. F16G 11/00; F16B 3/00
(52) U.S. Cl. ...................................... 24/115 R; 403/396
(58) Field of Search ...................... 241/115 R, 115 M, 241/136 R, 30.5 R, 30.5 L; 403/385, 388, 393, 394, 396

(56) References Cited

U.S. PATENT DOCUMENTS

| | | | |
|---|---|---|---|
| 2,416,423 A | * | 2/1947 | Van Vleet ............... 403/369 X |
| 3,100,324 A | * | 8/1963 | Tutino ......................... 24/346 |
| 4,842,530 A | * | 6/1989 | Erickson, II et al. ......... 439/98 |
| 5,358,423 A | * | 10/1994 | Burkhard et al. ........... 439/402 |
| 6,098,942 A | | 8/2000 | Heath |

FOREIGN PATENT DOCUMENTS

| | | |
|---|---|---|
| DE | 19635302 | 3/1998 |
| DE | 19635303 | 3/1998 |
| FR | 2567212 | 1/1986 |
| FR | 2 727 454 | 5/1996 |

* cited by examiner

Primary Examiner—Robert J. Sandy

(57) ABSTRACT

An attachment device for the attachment of two members, and is particularly envisaged for the attachment of objects to a post, bar, rod, wire, rope or the like. The device has two arms at one end that encompass the perimeter of the post, and pressure elements are provided to apply pressure to the post, to grip it securely. The device preferably includes a substantially cylindrical device having two threaded arms that encompass the post, with a nut being screwed to the thread to enable the device to grip the post, with the other end of the device being adapted in various ways to hold different objects.

17 Claims, 8 Drawing Sheets

V-LOCK

BACKGROUND OF THE INVENTION

The present invention relates to an attachment device, namely for the attachment of two members, and particularly being the means for mutual attachment of objects to posts, bars, rods, wires, ropes, or the like.

At present, attachment of objects to a post or similar is achieved by slipping a conventional clamp over one end of the post, by using a ring clamp tightened by a screw, by using a double C-clamp, that uses screws to grip both the post and the object, or simply by tying a piece of string around both the post and the object.

A conventional clamp that slides over the end of a post cannot be used on a closed post, unless it is pre-attached to the post during construction of the object of which the post is part.

For a ring clamp to be of use, it has to have a pre-designed integrally molded part adapted to grip the object to be attached.

A double C-clamp has the disadvantage of being post-specific, and not adaptable for posts of varying sizes.

It is therefore an object of the present invention to provide attachment means for attaching objects to a post, wherein said means is adapted for use on a closed post; said means is adapted to provide a strong grip; said means is adapted to attach and detach both readily and repeatedly; no preparation of the post is required; and said means is adapted for use for a wide variety of purposes.

BRIEF SUMMARY OF THE INVENTION

In accordance with the present invention, there is provided an attachment device for mutual attachment of two members. One end of the body of the device is a base which can be adapted in various ways for the attachment of a first member, and the other end has a form substantially of two arms formed by a slot in the basic shape such that the whole perimeter of a second member can be encompassed within the device.

Said arms are adapted to receive means for applying pressure to urge the second member towards the base.

In a preferred embodiment, the attachment device is used to attach an object to a post, bar, rod, wire, rope or the like.

Said arms are preferably threaded in order to receive said means for applying pressure, which could be a nut or equivalent tightening means able to engage the thread in a well known manner.

In use, in a cross-section in the plane perpendicular to the axis of a gripped upright, the slot can have a shape defined by angled sidewalls inclined towards the longitudinal axis of the body, said walls together forming substantially a "V" shape The shape of the slot can be further defined by a bottom wall which is parallel to the base of the device.

The shape of the slot can also incorporate a portion comprising walls parallel to the longitudinal axis of the body, in combination with either said angled sidewalls, or said bottom wall, or both.

Also in accordance with the present invention, there is provided a device wherein said pressure applying means is held at a fixed position.

The pressure applying means can be held in said fixed position by provision of stops or clips on the outer surface of the body of the device.

Also in accordance with the present invention there is provided a device incorporating a portion extending away from the main body of the device, and a horizontal pivot pin mounted on said portion at a location spaced, in use from a second member gripped in the device, the pivot pin being adapted to receive a bolt which, when bolted through an object, acts as a vertical pivot pin for the object, the two pins providing a universal joint.

This form of the invention is preferably used in the case where the object gripped is a frame member of a bicycle, and the second member is a leading arm of a trailer.

Also according to the present invention there is provided a device wherein the base has embedded therein a screw, the head of said screw protruding from the bottom wall of the slot so as to be easily accessed by a screwdriver or other screw tightening means. The surface penetration end of the screw protrudes outwith the body of the device so that said screw can be used to attach the device to any surface into which said screw is capable of being driven.

Also according to the present invention there is provided a device joined together base to base with another device, either by a pivoting arrangement, or as one piece, so as to provide means for joining two posts or similar.

Embodiments of the invention will now be described by way of example only, with reference to the drawings.

DETAILED DESCRIPTION OF THE INVENTION

Figure 1:
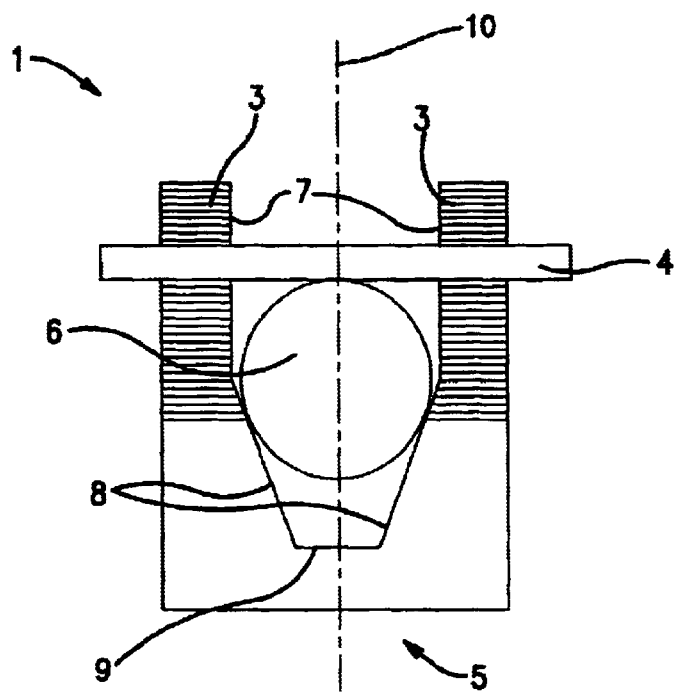
FIG. 1 is a cross-sectional view of one embodiment of the invention in the form of a basic device.
Figure 2:
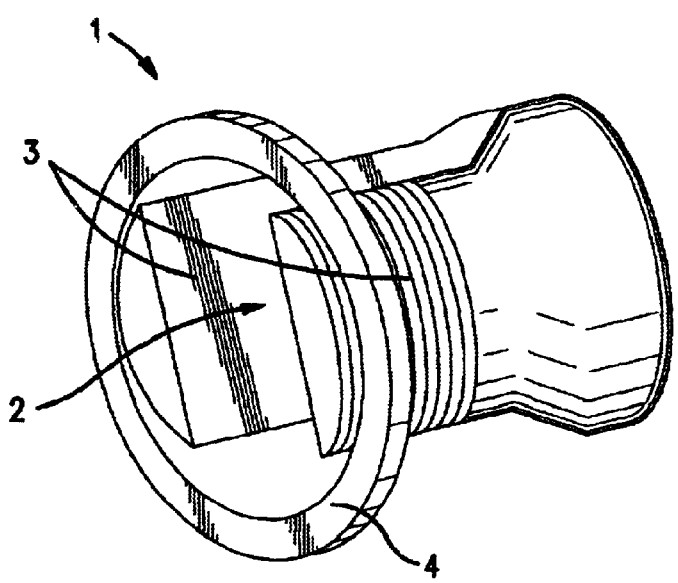
FIG. 2 is a perspective view of the device of FIG. 1.
Figure 3:
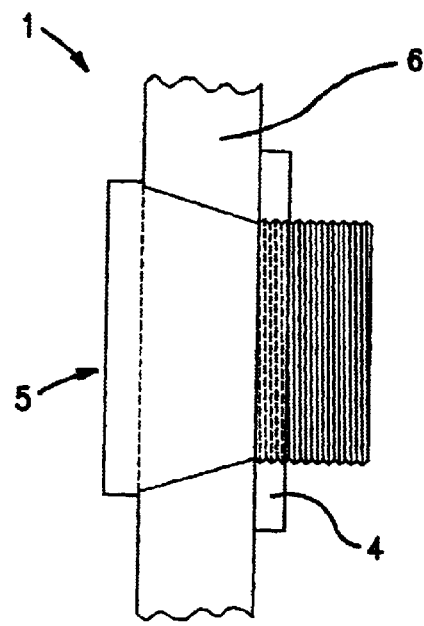
FIG. 3 is a side view of the device of FIG. 1.

FIGS. 1 to 3 illustrate a preferred embodiment of the invention, wherein the device is adapted for use for attachment of various objects (the first member) to a post, bar, rod, wire, rope, or the like (the second member). The device 1 has a substantially cylindrical body, with a large slot 2 cut out of it, effectively forming two arms 3 at one end. These arms 3 are threaded in order to receive a nut 4 or similar.

The slot 2 has a first portion having parallel edges 7 forming the arms 3, and a second portion further in to the body of the device 1, having angled edges 8 angled towards the body axis 10 of the cylinder that defines the body of the device 1; and a third portion having a bottom edge 9 that is parallel to the base 5 of the device 1. The angled edges 8 and the bottom edge 9 of the slot 2 form a "V" shape, namely a tapered slot that may have a bottom edge; that, together with the nut 4 when attached, grips the second member 6 at at least three points.

The open end of the device 1 is then simply placed round the second member 6, and the nut 4 is secured by engaging it with the threaded arms 3, in a well-known manner. This can be done by hand, making it easy to attach and detach the device 1 from a second member 6, or the nut could be tightened with tools such as a spanner or tommy bar. It will be appreciated that the threaded arms 3 could be engaged to grip the second member 6 by means other than a standard nut, for example with a large wing nut.

The base 5 of the device is adapted to receive a second member or to be attached to the desired first member in any convenient way, examples of which are described below.

Figure 4:
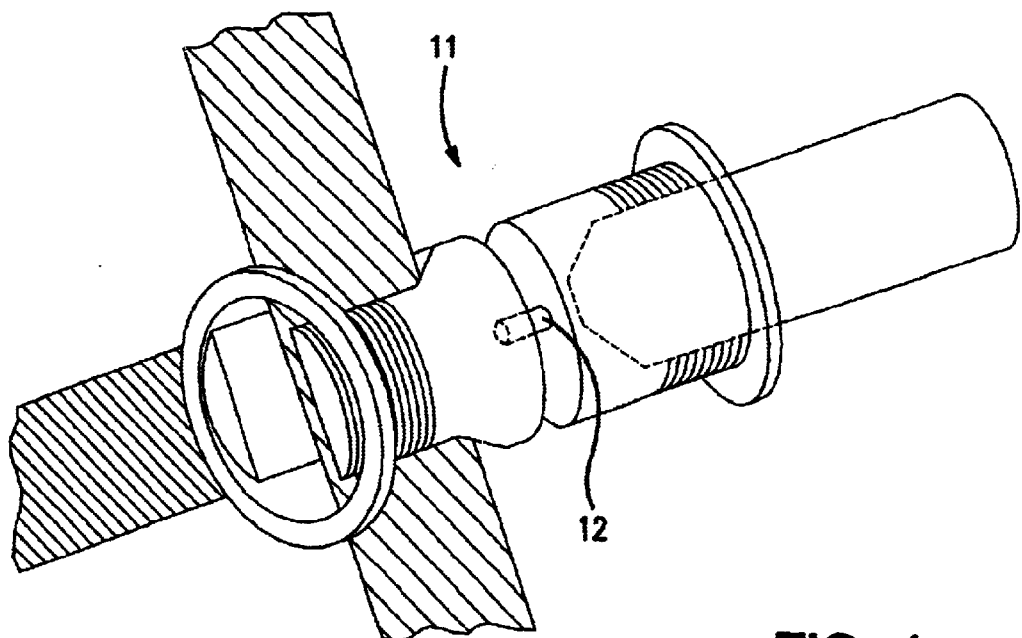
FIG. 4 is a perspective view of a pivoted double lock forming a second embodiment of the invention.

FIG. 4 illustrates a second embodiment, wherein a double lock 11 is provided, comprising two devices being connected by a pivot pin 12. This embodiment can be used for connecting and securing in place adjacent pieces of scaffolding or other such apparatus.

Figure 5:
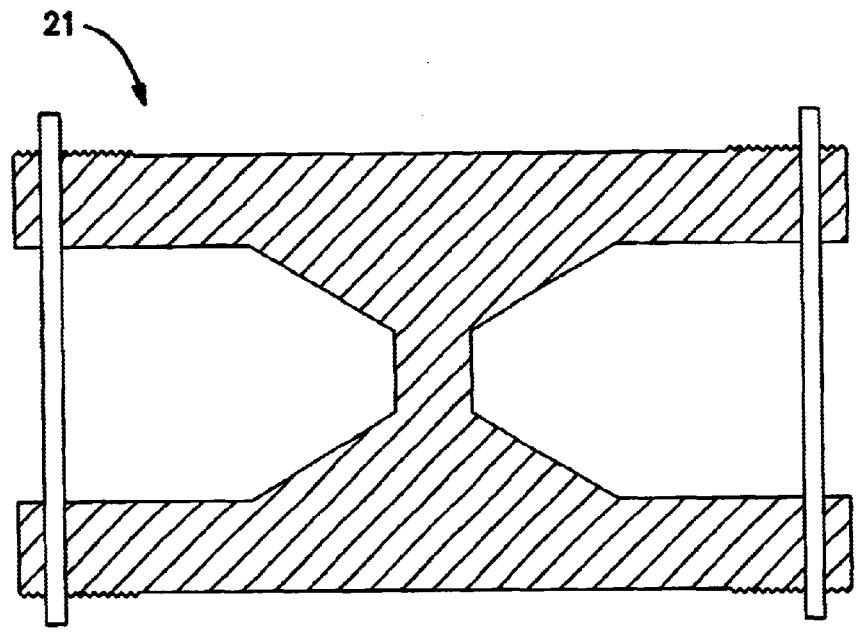
FIG. 5 shows a one piece double lock.

FIG. 5 illustrates a third embodiment, wherein a single piece double lock 21 is provided for the purpose of connecting and securing in place adjacent pieces of scaffolding or other such apparatus. This embodiment of the invention can be supplied with the two ends at different angles as required.

Figure 6:
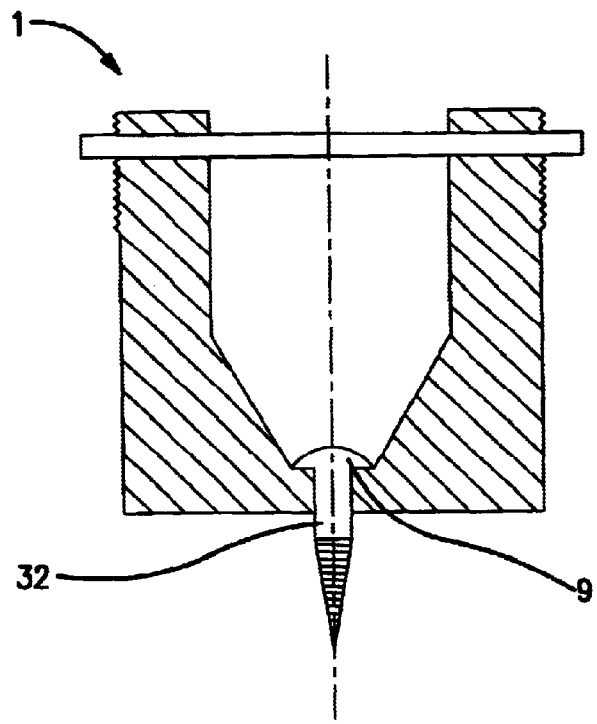
FIG. 6 shows an embodiment of the invention having an embedded screw.

FIG. 6 illustrates a fourth embodiment, wherein a screw 32 is embedded into the base of the device 1. The head of the screw 32 protrudes from the bottom edge 9 of the slot 2, so that it can be accessed by a screwdriver (not shown) or other such means of turning the screw 32, and the surface penetration end of the screw 32 extends outwith the body of the device 1 so that the device 1 can be attached to any surface which a screw can be driven into, particularly a substantially planar surface such as, for example, a poster or sign, before being attached to a second member 6.

Figure 7:
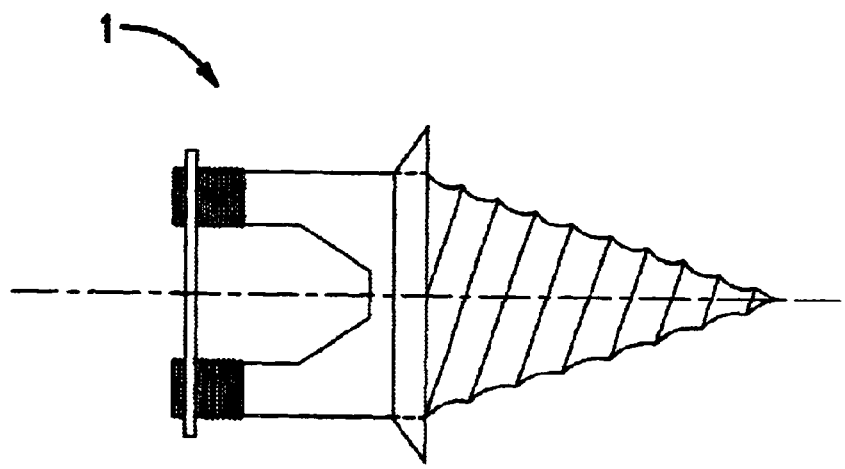
FIG. 7 shows an embodiment of the invention that itself forms the head of a screw.

FIG. 7 illustrates a fifth embodiment, wherein the device 1 itself forms the head of a screw, for similar purposes as the fourth embodiment.

Figure 8:
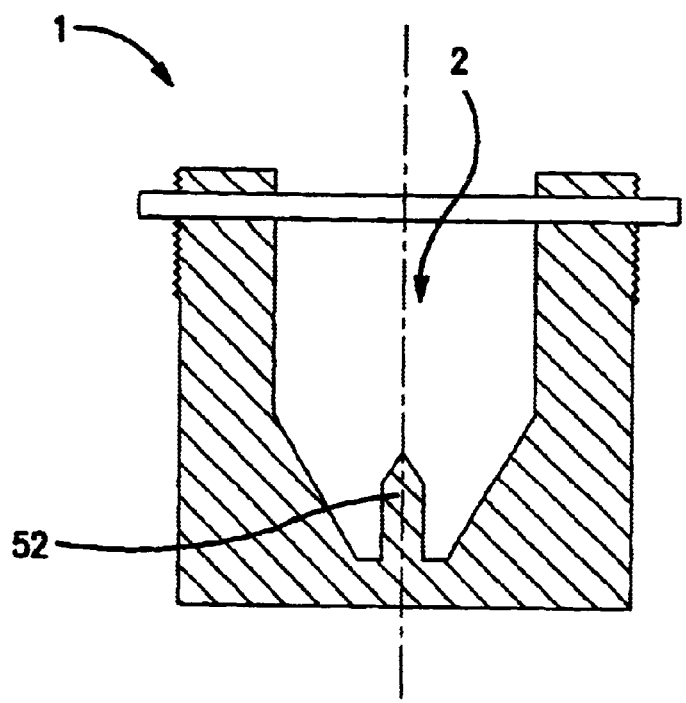
FIG. 8 shows an embodiment of the invention with a spike on the bottom edge of the slot.

FIG. 8 illustrates a sixth embodiment, wherein the bottom edge 9 of the slot 2 has formed thereupon a spike 52 to create a hole in a second member 6. This can be used to extract or inject gases or liquids, or to increase the security of the device 1. The spike 52 could also be adapted to act as a sensor.

Figure 9:
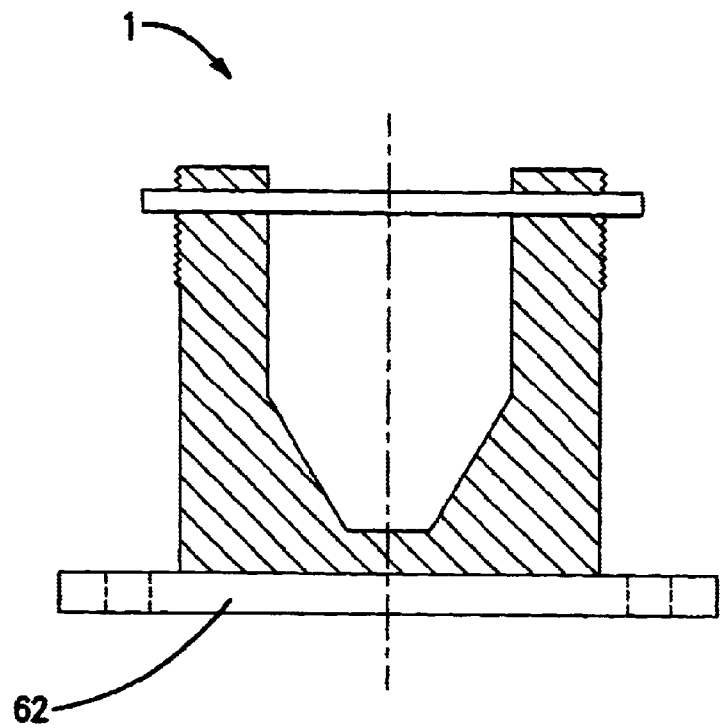
FIG. 9 shows an embodiment of the invention with an attached plate, adapted to receive fasteners.

FIG. 9 illustrates a seventh embodiment, wherein a plate 62 is supplied that facilitates the use of a number of fasteners (not shown) to attach the device to a wall or similar. For example, the plate 62 could have a number of holes designed to accommodate screws, bolts, or other such attachment means.

Figure 10:
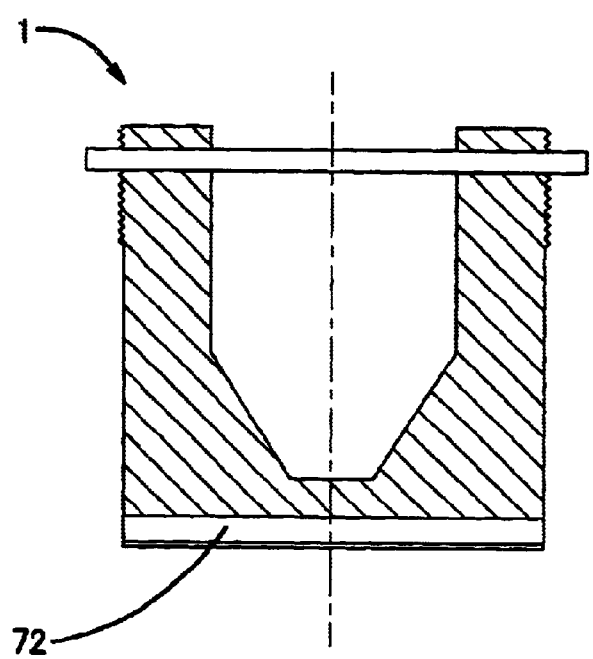
FIG. 10 shows a plastic embodiment of the invention with a peel-off sticky back.

FIG. 10 illustrates an eighth embodiment, which is a device 1 constructed from plastic, provided with a sticky back pad 72 for the attachment of objects, used for light applications.

Figure 11:
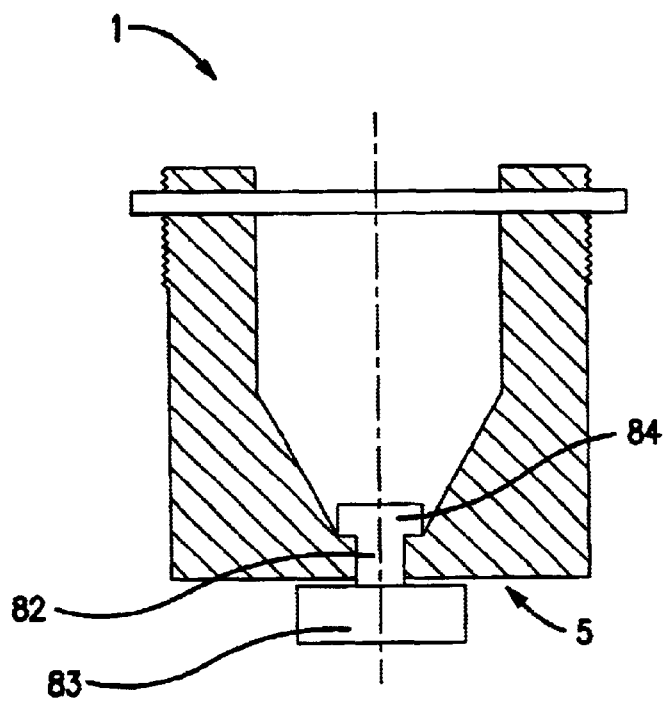
FIG. 11 shows an embodiment of the invention with attachment platform.

FIG. 11 illustrates a ninth embodiment, wherein a special connecting piece 82 is provided. The outer platform 83 can rotate within the device 1 until a second member 6 is clamped in, upon which the inner platform 84 is forced against the body of the device 1, holding the outer platform 83 at a set position. The outer platform is raised so as to sit slightly above the base 5 of the device 1, enabling objects to lock onto it. The outer platform 83 can be of various shapes, and can be threaded or otherwise adapted in a known manner to attach various devices, such as bicycle lights.

Figure 12:
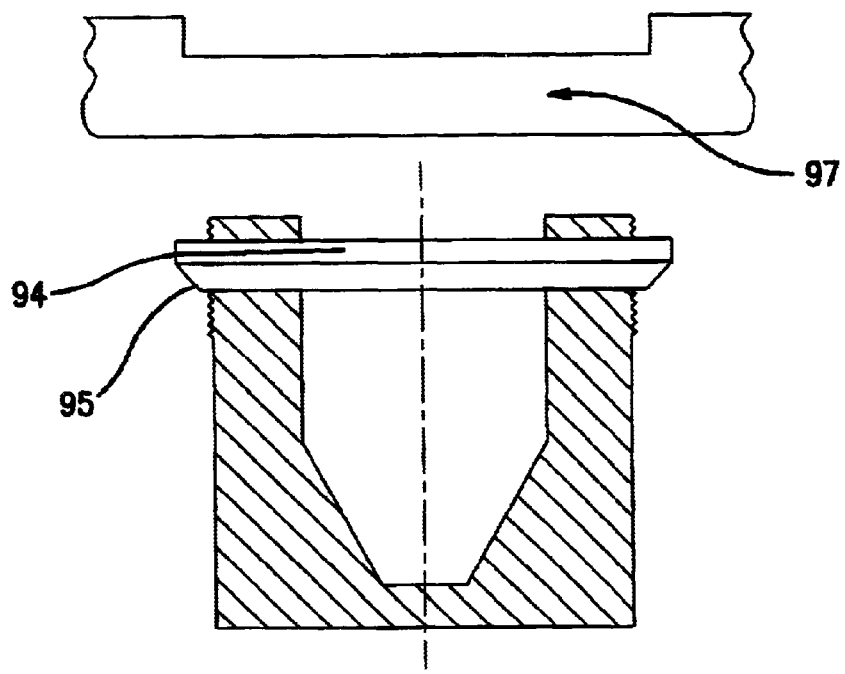
FIG. 12 shows an embodiment of the invention with a chamfered nut.

FIG. 12 illustrates a tenth embodiment, wherein the nut 94 of the device 1 is provided with a chamfer 95, so that, when used with a recessed bar 97, gives added security.

Figure 13:
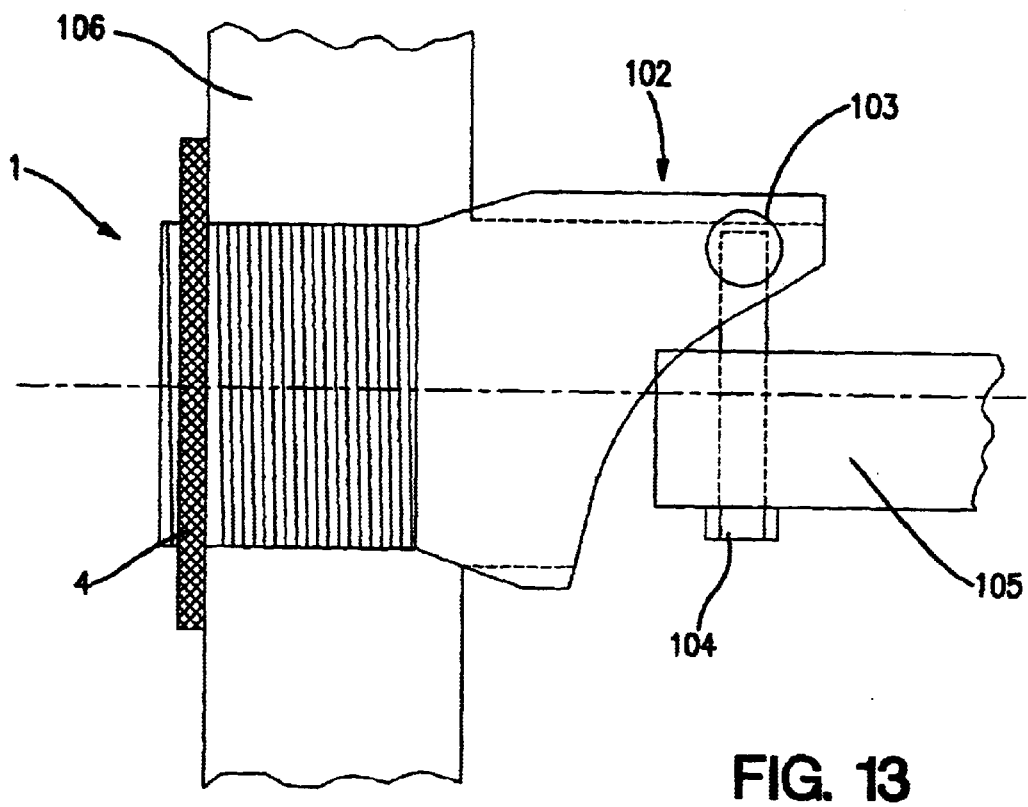
FIG. 13 shows an embodiment of the invention constructed from a hollow tube for use in a trailer linkage system.
Figure 14:
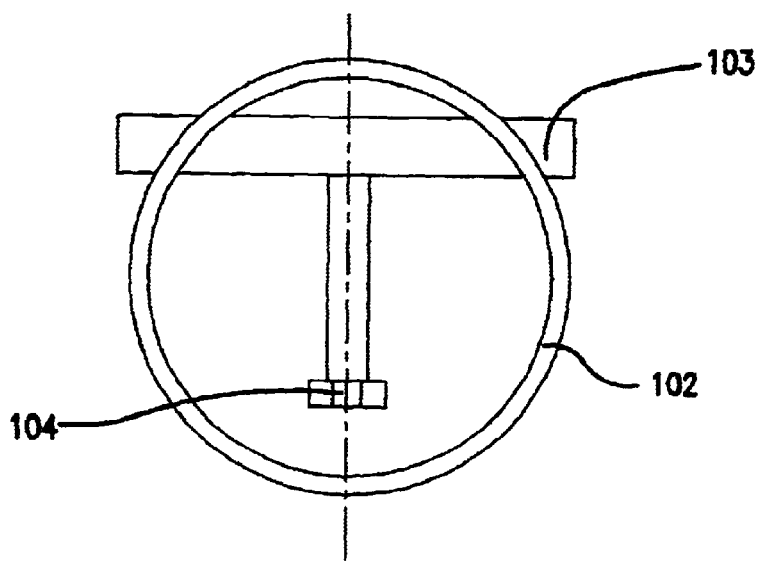
FIG. 14 is a cross section of the base of the device of FIG. 13.

FIGS. 13 and 14 show the device 1 in a particularly preferred use—in a trailer linkage system for a bicycle or motorcycle, wherein the device 1 is used to attach a seat post 106 of said bicycle or frame of said motorcycle to the leading arm 105 of a trailer.

The base of the device 1 takes the form of a hollow tube 102, which is cut away at the end in a manner such as that illustrated in FIG. 13. A horizontal pivot 103 is provided through the tube 102. A bolt 104 can be attached through a vertical hole in the leading arm 105 of the trailer to the horizontal pivot 103, thus forming a vertical pivot for the trailer.

These two pivots in combination provide a simple and cheap universal joint. As the device is itself part of the universal joint, the pivots are close to the seat post 106, thus minimising or at least reducing the forces in the attachment to the seat post 106, ensuring that a strong grip is provided while using a relatively light construction for the device.

As the vertical pivot has an axis which is fixed perpendicularly with respect to the trailer, the angle of lean is equal on the bicycle and the trailer, thus ensuring correct steering geometry upon cornering.

The trailer linkage can be removed simply by removal of either the nut 4 from the device 1, or the bolt 104 from the leading arm 105 of the trailer, and can then be easily used on other trailers and bicycles or motorcycles.

Figure 15:
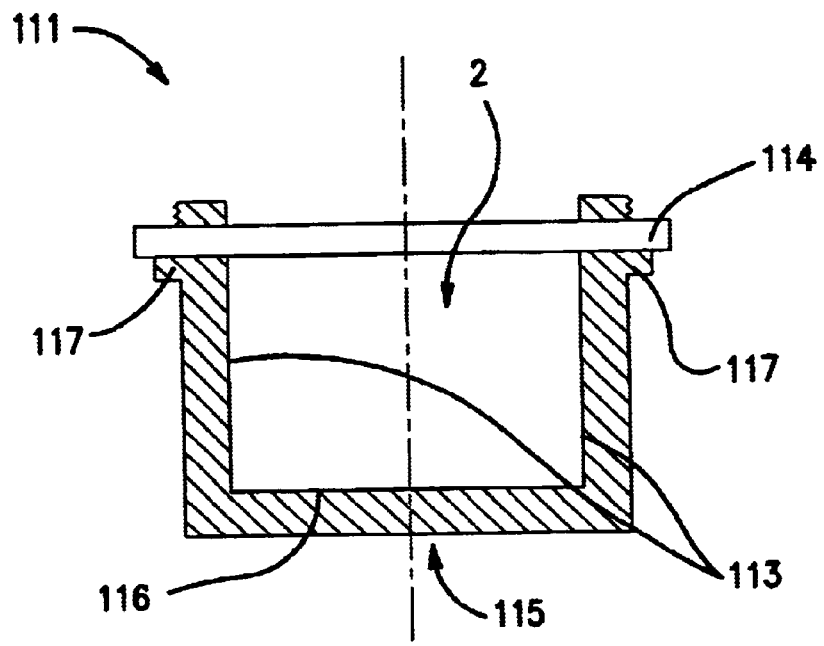
FIG. 15 shows a further embodiment of the invention.

FIG. 15 illustrates an embodiment of the invention, wherein the pressure applying means is held at a fixed point. It shows a device 111 having a substantially cylindrical body and threaded arms, wherein stops 117 are provided on the outer surface of the body of the device, so that the nut 114 is held at a certain position. This embodiment is appropriate for use in situations where a firm grip is not required, for example holding curtain rails, or holding spotlights on a rail such that the spotlights can be movable along the said rail.

Figure 16:
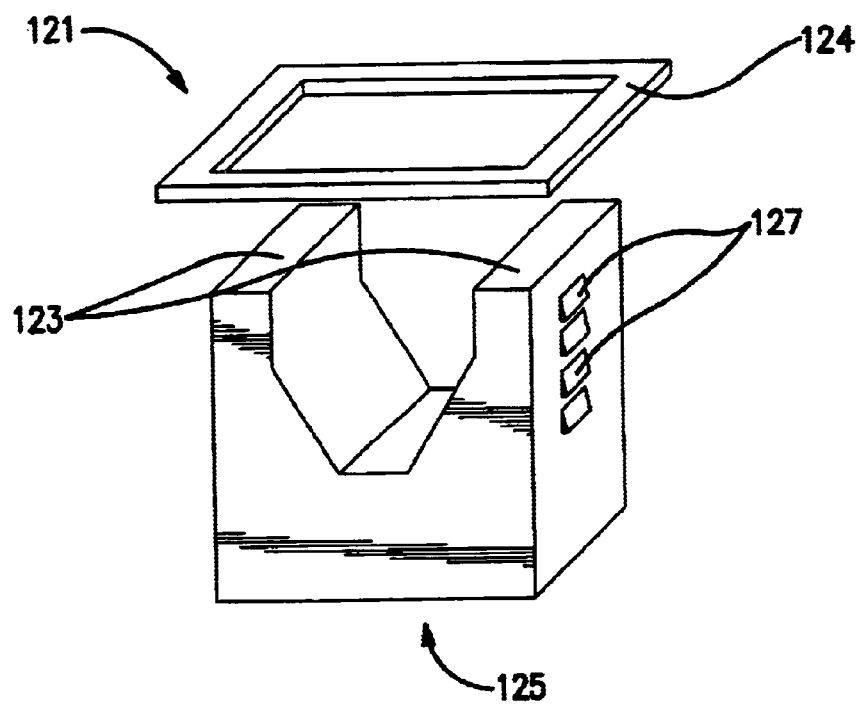
FIG. 16 shows a further embodiment of the invention.

FIG. 16 illustrates an embodiment of the invention having a body with rectangular cross-section, wherein the pressure applying means is held in a manner alternative to a screw thread. It shows a device 121, having a body with rectangular cross-section. A collar 124 is held in position by clips 127 on the arms 123.

Embodiments of the invention provide the following features and advantages over the prior art:

The device is preferably constructed from a suitable metal or alloy, though for lighter applications, a plastic embodiment could be employed, as shown, for example in FIG. 10 or FIG. 16.

In situations where the second member is fragile, for example if the device is being used to attach an object to a rope, a shim can be employed between the nut and the second member to protect the second member. Suitable surfaces could be adhered to the surfaces of the slot or the nut to provide required friction and/or protection properties.

An object can be attached quickly, easily, repeatedly and firmly to any point of a second member without the need to use tools, or to pre-prepare the second member. The device can also be used to attach a second member having an irregular or unpredictable shape. The device can be fitted to second members with closed ends, and one device will fit a range of sizes of second members. Devices can be supplied with different strengths of grip by using different angles in the "V", different thread pitches, or different surfaces in the "V" itself. The device can be secured by means of a lock nut or a split pin, or a padlock going through a hole in the threaded section.

It will be understood that the alternative forms of the base end of the device are not limited to the forms disclosed herein, and other forms serving different purposes may be incorporated into the device without departing from the scope of the invention.

What is claimed is:

1. An attachment device for attaching two members, said attachment device comprising:
    a body having first and second ends,
    said first end having a base for attachment to a first member,
    said second end having two arms with an axial slot therebetween so that an entire perimeter of a second member is encompassable within the two arms; and
    means for applying pressure to the second member disposed in the slot in use to urge the second member towards the base,
    wherein said slot has a shape defined in cross section by angled sidewalls inclined towards a longitudinal axis of the body, said sidewalls together forming substantially a "V" shape.

2. The attachment device as claimed in claim 1, wherein said second member is one of a post, bar, rod, wire and rope.

3. The attachment device as claimed in claim 1, wherein said means for applying pressure comprises a screw thread on said arms arranged and adapted to receive a nut for engaging the thread.

4. The attachment device as claimed in claim 1, wherein said means for applying pressure is held in a fixed position on said two arms.

5. The attachment device as claimed in claim 4, further comprising stops on an outer surface of the body for holding said means for applying pressure in said fixed position.

6. The attachment device as claimed in claim 4, further comprising at least one clip on an outer surface of the body for holding said means for applying pressure in said fixed position.

7. The attachment device as claimed in claim 1, wherein the base comprises:
    a portion extending away from the body; and
    a pivot pin mounted on said portion at a location spaced, in use, from said second member gripped in the device, said pivot pin being structured and arranged to receive a bolt for connecting said device to an object.

8. The attachment device as claimed in claim 7, wherein said object is a leading arm of a trailer, and wherein said second member is one of seat post or a frame member of a bicycle and a frame member of a motorcycle.

9. The attachment device as claimed in claim 1, further comprising a screw embedded in said base, a head of said screw protruding from an inside wall of said slot, and a surface penetration end of said screw protruding outside the body of the device for attachment to a surface into which said screw is being driven.

10. The attachment device as claimed in claim 1, further comprising a pivoting member joining two of said attachment devices together, base-to-base.

11. The attachment device as claimed in claim 1, wherein two of said attachment devices are integrally joined together, base-to-base.

12. The attachment device as claimed in claim 1, wherein said base has a through-hole and further comprising a connecting element slidable within said through-hole, said connecting element having first and second ends each having a platform wider than said through-hole so that said connecting element can not slide completely though either side of said through-hole, when in use, said second member contacting said first end platform so that when pressure is applied to said means for applying pressure, said second end platform becomes rigid.

13. An attachment device comprising:
    a body having first and second ends, said first end having a base, said second end having two screw threaded arms with an axial slot therebetween so that an entire perimeter of a member to be attached is encompassable within the two arms;
    a single nut for engaging said first and second arms and for applying pressure to the member to be attached disposed in the slot in use to urge the member to be attached towards the base;
    a pivot pin connected to said base having a female screw threaded portion; and
    a bolt detachably connected to said pivot pin by said screw threaded portion, so that when said attachment device is attached to an object, said bolt extends through said object to connect said object to said member to be attached.

14. The attachment device as claimed in claim 13, wherein the base is a hollow tube and the pivot pin is a chord of said hollow tube.

15. The attachment device as claimed in claim 14, wherein said hollow tube has an arcuate cut-out along a longitudinal axis of said hollow tube, so that when said object is connected to said attachment device, said object can pivot about an axis perpendicular to said longitudinal axis of said hollow tube.

16. An attachment device for attaching two members, said attachment device comprising:
    a body having a central portion and first and second ends, each said first and second ends having two arms with an axial slot therebetween so that an entire perimeter of a respective one of said two members to be attached is encompassable within respective ones of said two arms;
    a first nut for engaging said first and second arms of said first end and for applying pressure to one of said two members to be attached, disposed in the slot, in use, to urge said one of said two members towards the central portion; and
    a second nut for engaging said first and second arms of said second end and applying pressure to another one of said two members to be attached, disposed in the slot, in use, to urge said another one of said two members towards the central portion.

17. The attachment device according to claim 16, further comprising a pivoting member in said central portion, so that said first and second ends are pivotable with respect to each other.

* * * * *